March 14, 1972     J. E. MEGLES     3,649,440
STRENGTHENED LAMINATED GLASS BODIES
Filed July 9, 1969
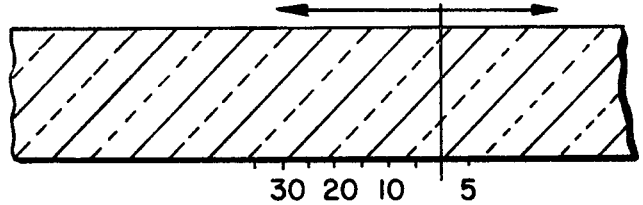
Fig. 1 — ANNEALED
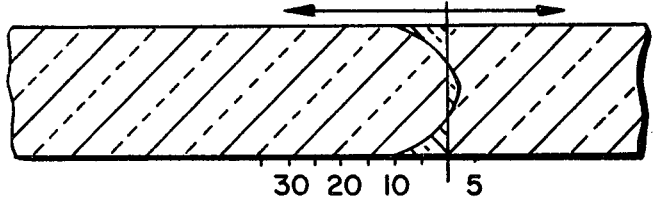
Fig. 2 — THERMAL TEMPER
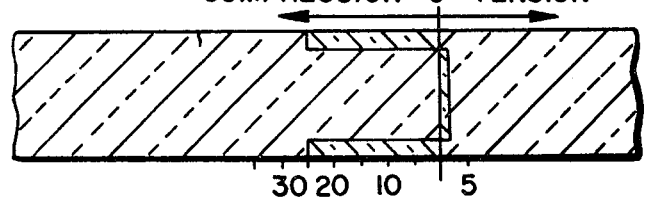
Fig. 3 — THREE-PLY LAMINANT AS FORMED
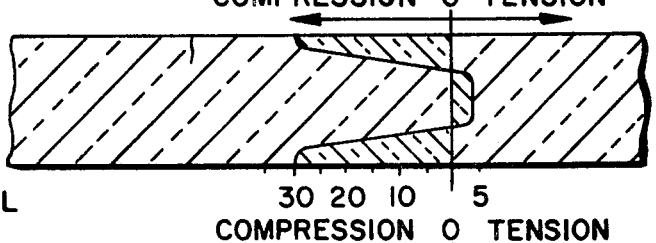
Fig. 4 — THREE-PLY LAMINANT THERMAL TEMPER
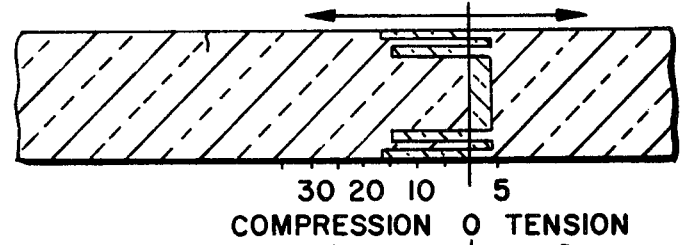
Fig. 5 — SEVEN-PLY LAMINANT AS FORMED
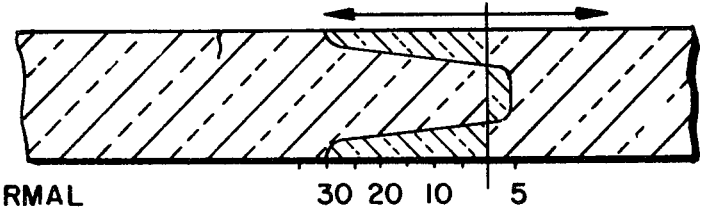
Fig. 6 — SEVEN-PLY LAMINANT THERMAL TEMPER
INVENTOR.
John E. Megles
BY
ATTORNEY United States Patent Office 3,649,440
Patented Mar. 14, 1972

3,649,440
STRENGTHENED LAMINATED GLASS BODIES
John E. Megles, Corning, N.Y., assignor to Corning
Glass Works, Corning, N.Y.
Filed July 9, 1969, Ser. No. 840,199
Int. Cl. B32b 17/06; C03b 23/20
U.S. Cl. 161—166
3 Claims

ABSTRACT OF THE DISCLOSURE

This invention relates to the supplemental strengthening of laminated articles of glass formed of a plurality of fused adjacent laminae, wherein each lamina exhibits a state of stress opposite to that of the lamina contiguous thereto, by thermal tempering such as to greatly increase the impact resistance of such articles and inhibit spontaneous breakage thereof due to bruise checking.

---

United States patent applications Ser. No. 735,074 and 735,115, filed June 6, 1968 and assigned to the same assignee as the present application, disclose the production of very strong multilayer glass articles wherein each layer demonstrates a state of stress opposite to that of an adjoining layer. In other words, the resultant laminated structure consists of laminae exhibiting tensile and compressive stresses in alternate relationship with one another. Those applications disclose means for the hot forming of such laminated articles wherein streams of molten glass of differing compositions and various viscosities are essentially simultaneously laid up in the desired structural order. The tensile and compressive stresses developed within the alternating layers are a function of the differences in the coefficients of thermal expansion of the individual laminae. Thus, for example, in a three layer laminate the core or interior portion of the article will have a higher coefficient of thermal expansion than the surrounding skin or surface portion. This body configuration yields an article wherein the surface layer is under compression whereas the interior portion is under tension. The presence of the surface compression layer imparts significantly improved mechanical strength to the article. Application Ser. No. 735,074 explains that three-ply flat laminates having an overall thickness of about 75 mils can be made by the process which will exhibit modulus of rupture values of about 30,000 p.s.i.

The very thinness of the articles, coupled with the exceptionally high strength obtainable therein, have recommended their use as tableware, when at least the skin or the core portion is an opal glass. Thus, dinnerware thinner than fine china can be produced with mechanical strengths severalfold greater. Nevertheless, whereas the mecvhanical strength of such articles, as measured in modulus of rupture values, is far and away greater than china or single ply glass articles, a serious breakage problem was encountered during testing of these laminated articles. This breakage was anomalous and frustrating in that it occurred in a random fashion. Hence, for example, a cup or a plate might break while being washed in an automatic dishwasher, while being handled in service, or even while simply standing on a shelf.

An intensive examination of the surface and cross-section of these laminated articles fostered the conclusion that this breakage originated from minute checks developed perpendicular to the glass surface resulting from impacts received on the surface from adjacent glass or other hard articles. These checks, then, yielded a type of delayed breakage wherein, in some instances, actual fracture did not occur until a substantial time after the impact took place which originally introduced the break source into the glass surface. The mechanics of this breakage led to this type of glass damage being termed a "bruse check."

The origin of a bruise check can be explained by visualizing the manner in which curved or pointed surfaces contact each other during an impact. The actual contact or impact occurs at a point, or no more than a very small area, on the glass surface. This phenomenon is more easily studied in the analogous loading situation obtaining when pressure is applied to crossed glass rods. Controlled experiments of such a situation have demonstrated that a tremendously high force per unit area is applied at essentially a single point on the glass surface. Data gathered from these studies have indicated further that this point loading generates very great stresses within the glass surface and, more importantly, a very high tensile stress is produced within the surface adjacent to the point of impact. This high tensile stress causes the development of the minute check in the glass surface.

An analysis of the evidence secured in studying the breakage character of the laminated articles of this invention illustrates that the depth of the initial check may frequently be inadequate to result in immediate breakage upon impact, but is sufficient to allow propagation into a subsurface zone of tensile stress during subsequent handling and washing of the article. Therefore, this situation permits checks to be classified into three categories: First, checks so shallow in depth that they can go essentially unobserved inasmuch as they never cause apparent damage; Second, checks originating from impacts of such force that they penetrate into the tensile stress zone at once and, hence, cause immediate breakage; and, Third, checks of a peculiarly critical depth, viz, the check does not cause immediate breakage but the depth is such that the check can penetrate or propagate somewhat deeper, e.g., by moisture entry, to a point within the tensile stress zone resulting in the anomalous spontaneous breakage. Thus, the critical depth coincides with the transition zone from compressive to tensile stress in a strengthened glass. The present invention is directed toward inhibiting the delayed or spontaneous breakage resulting from this third category of checks.

Therefore, the primary object of the instant invention is to provide a thin laminated glass article consisting of at least a skin and core portion which is essentially free from delayed breakage.

Another object of this invention is to provide a method for making a thin laminated glass article consisting of at least a skin and core portion which is essentially free from delayed breakage.

Other objects will become apparent from the following textual description of the invention and a study of the appended drawings wherein each figure is a stress profile diagrammatically representing the distribution of stress in a characteristic stress pattern and wherein:

FIG. 1 is a sectional view through a flat body of annealed glass;

FIG. 2 is a sectional view through a flat body of thermally tempered glass;

FIG. 3 is a sectional view through a flat body of three-ply laminated annealed glass;

FIG. 4 is a sectional view through a flat body of thermally tempered three-ply laminated glass;

FIG. 5 is a sectional view through a flat body of seven-ply laminated annealed glass; and FIG. 6 is a sectional view through a flat body of thermally tempered seven-ply laminated glass.

The horizontal lines of each figure designate the surfaces of a flat glass body. Centrally positioned in each figure is a vertical solid line which represents the actual thickness of the body and also serves as a zone reference line for a stress profile, i.e., a plotted curve indicating the magnitude, type, and rate of change of stress at any given depth in the body. Hence, utilizing this line as a zero reference line, compressive stress values, in thousands of p.s.i., are plotted to the left of the line and tensile stress values, in thousands of p.s.i., to the right of the line. The horizontal displacement of any point on the resulting stress profile curve in FIGS. 2, 3, 4, 5, and 6 indicates the magnitude of stress at the corresponding depth in the glass body. The intercepts of the stress profile curve and the zero stress line denote the depth of the compressive stress layer in the body as well as the plane at which the type of stress in the body changes from compressive to tensile.

In studying the causes of delayed breakage, it has appeared that the profile of the compression layer is more significant than the actual value of the mechanical strength imparted to the article thereby. Hence, the depth of the compression layer coupled with the stress gradient present therein seems to constitute the controlling factor in eliminating the delay breakage problem. For example, it has been observed that a thick surface layer, viz, greater than about 0.015", significantly diminishes the bruise check problem but such layers are undesirable since they frequently craze and even spall off the core body and, where a sound laminated article is formed, it usually breaks with explosive fragmentation upon fracture thereof.

I have discovered that delayed breakage in laminated glass articles made in accordance with Ser. Nos. 735,074 and 735,115, supra, can be inhibited by introducing therein a composite surface compression layer, i.e., a surface layer in which there is a composite of compressive stresses. Fundamentally, my invention produces a laminated glass article characterized by a composite compression layer with a stress profile that is generated by two compression layers, one of which extends relatively deep below the glass surface but has a lower magnitude of compressive stress than the second layer which is relatively shallow in depth. This composite compression layer results from the thermal tempering of laminated glass articles formed in accordance with Ser. Nos. 735,074 and 735,115. Thus, the thin lamina (normally 0.002"–0.010") of low thermal expansion exhibits high compressive stress whereas the thermal tempering provides a much deeper layer of compressive stress which, however, is of a much lower magnitude. Hence, the typical three-ply laminate suitable for tableware comprising a 0.070" interior portion with adhered skin plies of about 0.003" exhibiting a mechanical strength, in terms of modulus of rupture, of about 30,000–40,000 p.s.i. is frequently subject to delayed breakage resulting from bruise checks. Impacts occurring during use or in a dishwasher will not cause immediate breakage due to the inherent high strength of the laminate, but the resulting check may be of such a depth that it will propagate, particularly under the influence of moisture entry, through the skin lamina into the tensile stress zone of the core portion. However, when such a laminate is thermally tempered, a surface compression layer of about 0.015"–0.025" depth is developed which essentially eliminates delayed breakage since checks resulting from impacts cannot propagate therethrough.

Conventional thermal tempering contemplates three principal steps: (1) the glass article is heated to a temperature between the annealing and softening points of the glass, preferably close to the latter; (2) the glass surface is quickly cooled to a temperature below which the glass becomes set or rigid to establish a temperature gradient between the surface and interior temperatures of the article; and (3) the article is cooled to room temperature while maintaining the glass surface in its previously set condition. The chilling medium, e.g., an air blast, a liquid spray, an oil bath, or a fused salt bath, rapidly extracts heat from the surface of the article such that the surface will not undergo viscous flow or strain release. The temperature at which the glass becomes set or rigid is approximately midway between the strain and annealing points of the glass and has arbitrarily been designated as the "setting point." During the quenching step, the temperature in the interior of the glass article remains sufficiently high to permit viscous flow and strain release such that the stress which would normally develop is released. Thereafter, as the article is cooled to room temperature to remove the temperature gradient set up therein, the interior portion thereof seeks to draw the chilled surface inward and, in so doing, causes compressive stresses in the initially chilled surface layer.

In general, effective thermal tempering of glass articles requires wall thicknesses of at least 0.150"–0.200" in order to build up a large thermal gradient across the body. With special techniques, articles with wall thicknesses of about 0.125" have been successfully strengthened.

As is explained in the aforementioned Ser. No. 735,074, the preferred three-ply laminants are fabricated by forming a laminated sheet and then shaping the sheet into a desired configuration. The sheet may later be heat treated, e.g., to convert a transparent glass ply to an opal glass.

The stress profiles or patterns illustrated in FIGS. 1 and 2 correspond to actual profiles observed in ⅛" square elongated bars of an alkali aluminosilicate glass. The stress profiles demonstrated in FIGS. 3 and 4 relate to elongated bars of a three-ply laminant having an alkali aluminosilicate core portion of about 0.070" thickness with adhered plies of an alkaline earth aluminosilicate glass of about 0.003" thickness. FIGS. 5 and 6 illustrate the stress profiles observed in a seven-ply laminant, the structure of which is described in detail hereinafter. The observations were made with conventional stress measuring equipment utilizing a Babinet-type polarimeter compensator eyepiece. It will be appreciated, nevertheless, that each profile may be subject to a degree of variation by changing glass composition, body thickness, time and temperature of treatments, and other conditions. Therefore, while founded on actual observations resulting from typical treatments, the profiles should be deemed as essentially diagrammatic or illustrative in nature and, accordingly, subject to variations in some degree depending upon any particular set of circumstances.

An annealed glass article, by definition, has been heat treated above the annealing point of the glass to eliminate all existing stress and, subsequently, cooled in such a manner to introduce no appreciable amount of unrelieved stress. This absence of stress is illustrated in the glass bar of FIG. 1 by a stress profile which coincides identically with the vertical line of zero stress.

The illustrative glass body of FIG. 2 corresponds to FIG. 1 except that the bar has been subjected to a conventional thermal tempering treatment. The depth of the compression layer may be increased somewhat to produce a more triangularly-shaped pattern by employing an initial mild chill succeeded by a series of chills of progressively increasing severity. However, conventional commercial practice utilizes a steady chill or quenching which commonly yields a characteristic curved or parabolic stress profile. The intercepts of the stress pattern curve with the zero line indicate the effective depth of the compression layer to be about 0.015"–0.020". This is the depth within the glass surface to which compressive stresses extend or exist.

FIG. 3 manifests the typical stress profile obtained in three-ply laminated articles made in accordance with Ser. No. 735,074. This stress distribution can be characterized as rectilinear, i.e., the compressively-stressed outer plies experience about maximum compression and the tensilely-stressed core ply experiences about maximum tension. As illustrated, the stress distribution pattern comprises a very high compressive stress value at the glass surface in a relatively thin compression layer. Thus, the compression stress condition is concomitant with the thickness of the spin plies and changes abruptly to a relatively constant tension value. The result is a square pattern which is generally characteristic of this type of laminant.

FIG. 3 pictorially explains the bruise check problem of delayed breakage. Hence, there is a high compression value in the surface of the article while the depth of the layer is within the critical range discussed earlier. If a minute check caused by an impact extends into, but not through, this critical zone adjacent to the zero or stress transition line, it may lead to spontaneous delayed breakage as the check propagates therethrough into the zone of tensile stress. A check condition which would propagate and thereby initiate spontaneous glass breakage is depicted by the wavy line extending into the laminated bar of FIG. 3 from the upper surface toward the left side. It will be understood that the stress profile of FIG. 3 can be shifted somewhat depending upon the glass compositions employed and the skin thicknesses utilized, although the general geometry of the square pattern will be maintained.

A three-ply laminated glass article exhibiting the composite compressive stress characteristics of this invention is depicted in FIG. 4. The stress profile illustrated resulted from the thermal tempering of articles having a core portion of about 0.070" thickness with adhering skin plies of about 0.003" thickness. FIG. 4 clearly demonstrates the dramatic actions which the thermal tempering treatment has upon the stress profile of the three-ply laminant. First, the profile assumes curved lines rather than the square outline revealed in FIG. 3. Second, the intercepts of the stress pattern curve with the zero line denote the effective depth of the compression layer to be about 0.015"–0.020". Third, the stress distribution pattern points out that the maximum compressive stress and the maximum tensile stress are approximately the same as those illustrated in FIG. 3 but the change therebetween is much less abrupt. Hence, the effect of the thermal tempering is not an additive one with respect to substantially increasing the mechanical strength of the laminant but, instead, softens the square profile of the stresses within the laminant and demonstrably deepens the compression layer without significantly increasing the internal tension of the body.

The composite type of stress pattern illustrated in FIG. 4 is especially advantageous inasmuch as it permits one to achieve a maximum resistance to applied load or force, while at the same time securing maximum protection against delayed breakage resulting from surface impact. The former factor is a function of the mechanical strength of the article whereas the latter, as has been explained, is dependent upon the depth of the compressive stress zone and/or the stress gradient in or adjacent to the transition zone. Furthermore, this stress profile normally obviates breakage of an explosive nature since the internal tension developed within the body is not excessive. Inasmuch as some degree of catastrophic breakage must always be assumed, it is necessary to avoid or at least minimize explosive fragmentation when fracture does occur, particularly in table and culinary ware.

FIG. 5 demonstrates the usual stress profile displayed by a seven-ply laminated article manufactured in accordance with Ser. No. 735,115. The stress distribution here is similar to that displayed in FIG. 3, i.e., rectilinear, the principal difference being in the presence of the two inner layers exhibiting compressive stress. The bruise check problem explained above with respect to FIG. 3 is likewise present here since the skin layers of compressive stress are not thick enough to prevent check propagation into the initial zone of tension.

FIG. 6 illustrates the composite type of stress pattern resulting from thermal tempering the seven-ply laminant. It will be observed that the interior zones of compression have been smoothed out to yield a deep skin layer of considerably higher compressive stress than in the as-formed laminant. In other words, the stress profile approximates that reported in FIG. 4. Yet, this large overall increase in compression in the surface layer is not accompanied with a great increase in internal tension. Thus, the mechanical strength of the article is substantially improved without the development of such internal tension as to hazard breakage of an explosive nature.

The multi-ply glass articles produced in Ser. Nos. 735,074 and 735,115, supra, can be thermally tempered in overall thicknesses of 0.060" utilizing conventional tempering techniques. With greater care, overall thicknesses of 0.050" can be thermally tempered. As noted above, thermal tempering of single ply articles of 0.125" requires special skills to build up any large thermal gradient across the thickness and to accomplish this with little or no body distortion. It is believed that the multi-ply glass articles can be thermally tempered without body distortion in very thin cross-sections since very high compressive stresses are already present in the bodies for the physical support thereof and the tempering, while frequently superimposing a mild additional stress, principally acts only to cause the zone of compressive to move deeper into the glass article.

The actual glass compositions employed in making the multi-ply articles appear to have little, if any, effect on the outcome of the thermally tempering step provided, of course, that the original composite article is sound. In general, the total overall wall thickness of the multi-ply unit should be greater than about 0.050" to obviate distortion. Maximum thickness of an article is only dependent upon the practicality of thermally tempering thick bodies. Normally, tempering is limited to articles with wall thicknesses of less than one inch. For use as table and culinary ware, total wall thicknesses of about 0.065"–0.090" with skin thicknesses of at least 0.002" are preferred. Also, in accordance with Ser. Nos. 735,074 and 735,115, it is preferred that the ratio of the total thickness of tensilely-stressed plies to the total thickness of compressively-stressed plies be about 5:1 to 50:1 and the coefficient of thermal expansion of the compressively-stressed plies be at least $15 \times 10^{-7}/°$ C. less than that of the tensilely-stressed plies at the setting point of the composite. In general, the coefficient of thermal expansion of the thicker or core plies will range about $60$–$110 \times 10^{-7}/°$ C. whereas that of the thinner or skin plies will range about $30$–$80 \times 10^{-7}/°$ C.

The thermal tempering operation can be performed as a separate step. That is, after the multi-ply laminant has been produced, it can be cooled to room temperature for visual inspection of glass quality and, thereafter, thermally tempered. Nevertheless, it is much more commercially practical and economically efficient to conduct the tempering immediately following the forming of the laminant. Hence, the formed glass, while still warm, is passed to a heating chamber wherein the temperature thereof is raised to approach the softening point of the glass. The laminant is then quickly chilled, normally in an air stream.

With the preferred glasses of Ser. Nos. 735,074 and 735,115, the top tempering temperature ranges between about 650°–900° C. Whereas an air blast is normally employed for quenching the glass, baths of a molten salt and various oils operating at 300°–500° C. have been successfully employed. Baths of hot water have resulted in cracking and crazing of the surface.

In order to more specifically illustrate the invention and its attendant advantages, the following specific embodiments are described utilizing a three-ply laminant. Table I records the compositions of several body glasses and Table II reports the compositions of several clear skin glasses, the values cited being expressed in weight percent on the oxide basis. Various physical properties (softening point, annealing point, strain point, and coefficient of thermal expansion between 0°–300° C.) measured in the conventional manner are also recited for each glass composition.

TABLE I

| | 1 | 2 | 3 | 4 | 5 | 6 |
|---|---|---|---|---|---|---|
| Percent: | | | | | | |
| $SiO_2$ | 65.9 | 64.2 | 64.0 | 66.4 | 58.7 | 60.6 |
| $Al_2O_3$ | 6.2 | 6.2 | 6.2 | 6.3 | 18.1 | 16.3 |
| $B_2O_3$ | 4.5 | 4.8 | 4.5 | 1.3 | 0.4 | |
| MgO | 0.9 | 0.7 | | | 0.4 | |
| CaO | 13.6 | 14.6 | 15.7 | 15.7 | 0.6 | 1.1 |
| $Na_2O$ | 3.1 | 2.1 | 3.2 | 4.4 | 10.7 | 10.6 |
| $K_2O$ | 3.1 | 4.1 | 3.2 | 1.5 | | |
| ZnO | | | | | 7.3 | 7.8 |
| F | 2.7 | 3.3 | 3.2 | 4.4 | 3.8 | 3.6 |
| Softening point, °C | 864 | 924 | 860 | 870 | 787 | 813 |
| Annealing point, °C | 631 | 694 | 626 | 620 | 557 | 555 |
| Strain point, °C | 577 | 642 | 569 | 520 | 518 | |
| Expansion ($\times 10^{-7}$/°C.) | 70.7 | 73 | 71.1 | 69 | 69 | 61.3 |

Examples 5 and 6 are heat-treatable opals, i.e., glasses wherein opalization is developed by a subsequent nucleation and growth heat treatment. Hence, the glass is formed into a desired article in the clear state and the article is then heat treated at temperatures ranging from the strain point to slightly above the annealing point of the glass to cause the production of light-diffusing crystallites, in the above examples a fluoride crystals. Examples 1–4 are spontaneous opals, i.e., fluoride crystals precipitate out in the glass as the article cools.

TABLE II

| | 7 | 8 | 9 | 10 | 11 |
|---|---|---|---|---|---|
| Percent: | | | | | |
| $SiO_2$ | 58.2 | 56.0 | 59.4 | 56.7 | 62.2 |
| $Al_2O_3$ | 14.8 | 14.3 | 15.0 | 14.9 | 14.8 |
| CaO | 15.0 | 19.3 | 14.6 | 11.9 | 23.0 |
| MgO | 5.7 | | 6.5 | 8.6 | |
| $B_2O_3$ | 6.3 | 10.4 | 4.5 | 7.9 | |
| Softening point, °C | 89 | 877 | 898 | 883 | 952 |
| Annealing point, °C | 704 | 695 | 712 | 700 | 772 |
| Strain point, °C | 665 | 659 | 671 | 661 | 728 |
| Expansion ($\times 10^{-7}$/°C.) | 48 | 49 | 47 | 46 | 54.7 |

Various combinations of Examples 1–6 and Examples 7–11 were formed into three-ply laminates, the lamination being undertaken at temperatures whereat the ratio of the viscosity of the core portion to that of the skin portions ranged from about 1:1 to 6:1. In general, the lamination was accomplished at temperatures between about 1250°–1350° C. The hot laminated sheet was sagged into a custard cup-shaped mold, trimmed, removed from the mold, and allowed to cool. The custard cup formed thereby had a rim diameter of 4½ inches, a bottom diameter of 3 inches, and was 1⅜ inches high. The core glass ply was about 0.080″ thick and the total thickness of the skin plies about 0.004″. Laminants employing Examples 5–6 were heat treated at temperatures ranging from 550°–700° C. to develop opalization therein.

For the comparison purposes of Table III, groups of samples of each laminant as formed above were compared with samples of each laminant which had been subsequently thermally tempered. Table III reports the thermal tempering procedure utilized with each laminant as well as the results of various tests to which the articles were subjected. In each instance, an air blast for about 30 seconds comprised the quenching medium.

Since essentially all applications for glass articles contemplate exposure to surface abrasion and it is well-appreciated that surface abuse normally severely lowers the mechanical strength of glass, the modulus of rupture measurements recorded reflect measurements secured on ¼″ cane samples which had been previously abraded by 150 grit ($Al_2O_3$) abrasive cloth distributed by the Carborundum Company.

The rim impact test comprised first abrading the articles with the Carborundum 150 grit abrasive cloth, the abrasion being conducted in a direction parallel to the sidewall. Thereafter, the article was placed in a "V" block lined with pressed wood. A pendulum-type impact machine is used and a plastic billiard ball is so placed at the end of the pendulum that the center of the ball touches the outside bead of the article rim when the pendulum hangs vertically.

The rim of the ware is then struck by releasing the pendulum from an initial displacement of 3°. The article is rotated and impacted twice more at random spots around the rim at the same energy. Assuming survival, the displacement of the pendulum from the rim is increased in 3° increments and the ware struck at three random spots along the rim at each increment until breakage occurs. The impact force, in foot pounds, is thereafter calculated from the displacement of the pendulum.

Tables III and IV report the impact force required to fracture the ware of an average of six samples.

The drop test consisted of first abrading the articles with the Carborundum 150 grit abrasive cloth, the abrasion being conducted in a circular motion over the entire surface of the article, in a horizontal posture, is then dropped onto a maple plank of 2″ thickness. The ware is dropped three times at each height, beginning at 12″ and increasing at 3″ increments until breakage occurs.

Tables III and IV report an average drop height of six samples to cause fracture thereof.

The tumble test comprised placing 14 bowls having a 16 ounce capacity into a 11″ x 11″ x 8″ steel cage. The cage was rotated at 8 r.p.m. about the long axis while, simultaneously, a detergent solution having a pH of 11 was sprayed on the ware at a rate of 1 pint/minute through the venturi air spray nozzles. After five minutes of tumbling, the articles were transferred to a commercial automatic dishwater and subjected to 30 cycles therein while being exposed to the same detergent solution noted above.

Each cycle of the dishwasher is about 30 seconds and the cycles are repeated until one-half of the articles have been fractured through mechanical breakage or delayed breakage. An examination of the fracture characteristics will differentiate between those two kinds of breakage.

Tables III and IV record the times, in minutes, of exposure to dishwasher cycles to deplete the group of samples to one-half the number thereof.

The hardened point test involved bruise checking holloware articles employing a carbide typed punch having an 80° solid angle. The quantity of energy applied to each article is the same and ought not to exceed that required to produce a bruise or small chip therein. Impact energies of 0.2 foot pounds and less have been found adequate to cause bruise checks. The ware is struck on the rim and in the area of curvature near the base. After the impacting, the articles are filled with boiling water.

Tables III and IV report the percentage of samples which broke when filled with the boiling water. This test dramatically points up the migration of a bruise check through the surface compression layer into the zone of tension which the penetration of moisture can cause.

Table IV illustrates the definite improvement in physical properties which the tempering process also imparts to laminants consisting of more than three plies. Thus, whereas the "as formed" mechanical properties of the seven-ply laminants are somewhat better than those of the

TABLE III

| Laminant | Tempering schedule | Modulus of rupture, | Drop height, inches | Rim impact, foot pounds | Tumble test, minutes, | Hardened point test, percent |
|---|---|---|---|---|---|---|
| Example 2 and 7 | Heat to 780° C., hold 10 minutes; air blast of 30 seconds. | 38,000 | 60 | 0.75 | 247 | 0 |
| Example 2 and 7 | None | 30,000 | 36 | 0.33 | 59 | 30 |
| Example 1 and 7 | Heat to 800° C.; hold 10 minute ; air blast of 30 seconds. | 36,000 | 74 | | 60 | 0 |
| Example 1 and 7 | None | 30,000 | 30 | | 19 | 40 |
| Examples 3 and 8 | Heat to 780° C., hold 10 minutes; air blast of 30 seconds. | | 55 | | 120 | |
| Examples 3 and 8 | None | | 24 | | 35 | |
| Examples 5 and 10 | Heat to 780° C.; hold 5 minutes; air blast of 30 seconds. | | 71 | 0.89 | | |
| Examples 5 and 10 | None | | 55 | 0.45 | | |
| Examples 6 and 11 | Heat to 830° C.; hold 5 minutes; air blast of 30 seconds. | | 66 | 0.60 | | 0 |
| Examples 6 and 11 | None | | 42 | 0.40 | | 20 |
| Examples 4 and 8 | Heat to 830° C.; hold 5 minutes; air blast of 30 seconds. | 35,000 | | 0.85 | 250 | 0 |
| Examples 4 and 8 | None | 32,000 | | 0.48 | 31 | 30 |
| Examples 5 and 9 | Heat to 780° C.; hold 10 minutes; air blast of 30 seconds. | | | 0.65 | 60 | |
| Examples 5 and 9 | None | | | 0.35 | 12 | |

Table III unequivocally demonstrates the great improvement in mechanical properties which the tempering process imparts to the laminated articles. It must be observed, however, that the thermal tempering does not substantially affect the strength of the article, as measured by modulus of rupture, but significantly increases its resistance to impact and essentially eliminates delayed breakage therein. This, as has been explained above, is believed to be due to the increase in depth of the compression layer and the rounding of the stress profile.

FIGS. 3 and 4 represent the profile observed through a Babinet Polarimeter utilizing a three-ply laminant made from a combination of Examples 2 and 7.

Table IV reports the results of the same tests recorded in Table III conducted in the same manner but on a seven-ply laminant compised of the glasses of Examples 2 and 7. The laminant had an overall thickness of 0.080" with 0.002" skin layers of Example 7 glass, adjacent 0.005" layers of Example 2 glass, 0.001" layers of Example 7 inwardly contiguous thereto, and with a core portion of Example 2 glass.

three-ply laminant "as formed," the tempering step provides a tremendous advantage in inhibiting bruise check breakage which is still endemic in the multi-ply structures.

FIGS. 5 and 6 depict the stress profile observed through a Babinet Polarimeter utilizing the above-described seven-ply laminant of Examples 2 and 7.

I claim:

1. A method for strengthening a multi-ply laminated glass article, at least one outer lamina in a state of compression, and having at least one inner tensilely stressed lamina, and wherein each lamina exhibits a state of stress opposite to that of laminae adjacent thereto which comprises the steps of thermally tempering said glass article to extend a zone of compressive stress into the inner lamina.

2. A method according to claim 1 wherein said thermal tempering is achieved by air quenching.

3. In a multi-ply laminated glass article comprising at least one compressively stressed outer lamina and a tensilely stressed core portion, the improvement which comprises a zone of compressive stress extending into the core portion.

TABLE VI

| Laminant | Tempering schedule | Modulus of rupture, | Drop height, inches | Rim impact, foot pounds | Tumble test, minutes, | Hardened point test, percent |
|---|---|---|---|---|---|---|
| Examples 2 and 7 | Heat to 780° C.; hold for 10 minutes; air blast of 30 seconds. | 40,000 | 90 | 1.4 | 274 | 0 |
| Examples 2 and 7 | None | 33,000 | 36 | 0.4 | 30 | 30 |

References Cited

UNITED STATES PATENTS 3,287,200  11/1966  Hess et al. _____ 65—114

FOREIGN PATENTS 374,059  8/1939  Italy _____ 65—114
684,264  4/1964  Canada _____ 65—114

ARTHUR D. KELLOGG, Primary Examiner

U.S. Cl. X.R.

65—41, 104, 114; 161—193

UNITED STATES PATENT OFFICE
CERTIFICATE OF CORRECTION

Patent No. 3,649,440           Dated March 14, 1972

Inventor(s)  John E. Megles

It is certified that error appears in the above-identified patent and that said Letters Patent are hereby corrected as shown below:

Column 1, line 57, change "mecvhanical" to -- mechanical --.

Column 5, line 22, change "spin" to -- skin --.

Column 6, line 40, after "compressive" insert -- stress --.

Column 7, line 46, change "crystals" to -- crystal --.

Column 7, Table II, Example 7, for Softening Point, °C., change "89" to -- 890 --.

Column 9, line 44, change "compised" to -- composed --.

Column 10, Claim 1, line 36, after "article," insert -- having --.

Signed and sealed this 19th day of September 1972.

(SEAL)
Attest:

EDWARD M. FLETCHER, JR.
Attesting Officer

ROBERT GOTTSCHALK
Commissioner of Patents